US012803015B2

United States Patent

(12) United States Patent
Ancimer et al.

(10) Patent No.: US 12,803,015 B2
(45) Date of Patent: Nov. 17, 2026

(54) FUEL CELL POWER MODULE AND AIR HANDLING SYSTEM TO ENABLE ROBUST EXHAUST ENERGY EXTRACTION FOR HIGH ALTITUDE OPERATIONS

(71) Applicants: CUMMINS INC., Columbus, IN (US); HYDROGENICS CORPORATION, Mississauga (CA)

(72) Inventors: Richard J. Ancimer, Toronto (CA); Salvatore Ranieri, Etobicoke (CA); Nathaniel Ian Joos, Toronto (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 828 days.

(21) Appl. No.: 17/764,782

(22) PCT Filed: Nov. 4, 2020

(86) PCT No.: PCT/US2020/058895
§ 371 (c)(1),
(2) Date: Mar. 29, 2022

(87) PCT Pub. No.: WO2021/092021
PCT Pub. Date: May 14, 2021

(65) Prior Publication Data

US 2022/0344683 A1 Oct. 27, 2022

Related U.S. Application Data

(60) Provisional application No. 63/069,463, filed on Aug. 24, 2020, provisional application No. 62/930,859, filed on Nov. 5, 2019.

(51) Int. Cl.
*H01M 8/04111* (2016.01)
*H01M 8/04014* (2016.01)
(Continued)

(52) U.S. Cl.
CPC .... *H01M 8/04111* (2013.01); *H01M 8/04014* (2013.01); *H01M 8/04156* (2013.01); *H01M 8/1018* (2013.01); *H01M 2250/20* (2013.01)

(58) Field of Classification Search
None
See application file for complete search history.

(56) References Cited

U.S. PATENT DOCUMENTS 4,923,768 A * 5/1990 Kaneko ............. H01M 8/04225
429/444
6,607,854 B1 8/2003 Rehg
(Continued)

FOREIGN PATENT DOCUMENTS

CN 107004876 A 4/2020
DE 102010064061 8/2011
(Continued)

OTHER PUBLICATIONS

Machine English translation of WO2021083578A1 originally published to Bayerle May 6, 2021 (Year: 2021).*
(Continued)

*Primary Examiner* — Ula C Ruddock
*Assistant Examiner* — Mary Grace Harris
(74) *Attorney, Agent, or Firm* — Barnes & Thornburg LLP

(57) ABSTRACT

The subject matter described herein generally relates to a fuel cell power module and air handling system and methods of operating such a system to enable robust exhaust energy extraction for high altitude.

20 Claims, 7 Drawing Sheets

(51) Int. Cl.
*H01M 8/04119* (2016.01)
*H01M 8/1018* (2016.01)

(56) References Cited

U.S. PATENT DOCUMENTS

| | | | | |
|---|---|---|---|---|
| 6,641,084 | B1 * | 11/2003 | Huber | H01M 8/00 429/496 |
| 6,834,831 | B2 * | 12/2004 | Daggett | H01M 8/04089 429/495 |
| 7,344,787 | B2 | 3/2008 | Formanski et al. | |
| 7,592,083 | B2 | 9/2009 | Meltser et al. | |
| 8,623,566 | B2 | 1/2014 | Westenberger et al. | |
| 10,297,846 | B2 | 5/2019 | Park et al. | |
| 10,483,563 | B2 | 11/2019 | Grundei et al. | |
| 2004/0124308 | A1 | 7/2004 | Daggett | |
| 2004/0150366 | A1 | 8/2004 | Ferrall et al. | |
| 2004/0151964 | A1 | 8/2004 | Finger et al. | |
| 2004/0191585 | A1 * | 9/2004 | Morita | H01M 8/04126 429/513 |
| 2006/0251946 | A1 * | 11/2006 | Makuta | H01M 8/248 429/470 |
| 2015/0155573 | A1 * | 6/2015 | Jo | H01M 8/04134 429/437 |
| 2017/0167037 | A1 | 6/2017 | Rheaume | |
| 2019/0300181 | A1 | 10/2019 | Shea | |
| 2019/0363381 | A1 | 11/2019 | Haag et al. | |

FOREIGN PATENT DOCUMENTS

| | | | | |
|---|---|---|---|---|
| DE | 102017220855 | | 5/2019 | |
| DE | 102018202906 | | 8/2019 | |
| DE | 102018202906 | A1 | 8/2019 | |
| WO | WO-2008049444 | A1 * | 5/2008 | H01M 8/04007 |
| WO | WO-2021083578 | A1 * | 5/2021 | H01M 8/04753 |

OTHER PUBLICATIONS

The Design of High-Efficiency Turbomachinery and Gas Turbines, Second Edition, With a New Preface, by David Gordon Wilson and Theodosios Korakianitis, Paperback, ISBN: 9780262526685, Pub date: Sep. 12, 2014, Publisher: The MIT Press, 624 pp.

PCT Search Report and Written Opinion prepared for PCT Application No. PCT/US2020/058895, completed Feb. 19, 2021.

* cited by examiner

FUEL CELL POWER MODULE AND AIR HANDLING SYSTEM TO ENABLE ROBUST EXHAUST ENERGY EXTRACTION FOR HIGH ALTITUDE OPERATIONS

This application is a national stage entry under 35 U.S.C. § 371(b) of PCT International Application No. PCT/US2020/058895, filed Nov. 4, 2020, which claims the benefit under 35 USC § 119(e) of U.S. Provisional Application Ser. No. 62,930,859, filed on Nov. 5, 2019 and U.S. Provisional Application Ser. No. 63/069,463, filed on Aug. 24, 2020, the entire disclosures of all of which are incorporated herein by reference.

CROSS-REFERENCE TO RELATED APPLICATIONS

This application claims the benefit under 35 USC § 119(e) of U.S. Provisional Application Ser. No. 62,930,859, filed on Nov. 5, 2019 and U.S. Provisional Application Ser. No. 63/069,463, filed on Aug. 24, 2020, the entire disclosures of both of which are incorporated herein by reference.

FIELD OF THE INVENTION

The subject matter described herein generally relates to a fuel cell power module and air handling system to enable robust exhaust energy extraction for high altitude operations.

BACKGROUND

Trucks used in mining, referred to as mining trucks, mine trucks, or mine haul trucks, often operate at high altitudes. Mining operations may experience many economic and logistical considerations due to the inability of fuel cell powered trucks and equipment to robustly operate or perform at high altitudes where mining often occurs. More specifically, during operation at such high altitudes, fuel cells powering mine haul trucks or equipment often degrade rapidly resulting in high costs. Multiple factors leading to rapid degradation of fuel cell power module systems, including fuel cells, at high altitudes include: 1) increased parasitic load due to air compression, 2) less efficient operation and limited power capability, 3) sensible exhaust energy from compressed air is rejected to coolant resulting in a higher cooling load required from the fuel cell cooling system, and 4) a large electrical motor required to power the compressor. Other considerations include 1) water condensation within turbo-machinery that can lead to damage, and 2) compressor surge limits that can impact low load operation.

To address these issues related to power generation in high altitude environments, the fuel cell systems in the market today employ one or more known baseline fuel cell power module systems, as shown in FIG. 1, or improved fuel cell power module systems, as shown in FIGS. 2A and 2B. These system configurations comprise multiple components, such as air handling components or devices that are connected or coupled together (e.g., in series) to address or improve the degradation concerns prevalent with fuel cells operated at high altitudes (see FIG. 2A). Additional fuel cell power module systems have been proposed that comprise many of the features or components of the baseline model (see FIG. 1), with additional system components resulting in increased performance of the improved system (see FIG. 2B).

While these system configurations provide flexibility to mitigate mechanical and pressure limits that cause surge, parasitic load, and condensation, which are known to be detrimental and/or damaging to elements in these power generation system embodiments at high altitudes, there remains an unmet need for further improved fuel cell module and air handling systems. More specifically, the baseline and improved fuel cell power module systems that are currently available do not require specific types of turbines to be coupled to a compressor and motor. In addition, the fuel cell power module systems in the art are very difficult to optimize, and do not explicitly or specifically address all of the requirements to robustly operate fuel cell powered trucks or equipment at high altitudes.

As such, there remains an unmet need to provide further improved fuel cell power module and air handling systems that reduce cooling load, reduce on-board hydrogen storage requirements, and enable robust energy extraction operation at high altitudes ensuring that mechanical limits of the system are not violated in order to reduce or avoid surge, wheel speed, temperatures, water condensation, and other damaging features of a fuel cell power module system that occur at high altitudes.

SUMMARY OF THE INVENTION

The present disclosure is directed to a fuel cell power module system to enable robust exhaust energy extraction for high altitude operations, comprising: an air filter, at least two compressors, a first compressor and a second compressor, wherein the second compressor is mechanically coupled to a turbine, one or more heat exchangers, one or more fuel cells, and one or more fluid valves. The air filter may be a low pressure air filter. The high altitudes comprise altitudes ranging from about 100 to about 5000 meters above sea level.

The first compressor may be an electrically-driven compressor. The one or more heat exchangers may be an air to liquid heat exchanger. The one or more heat exchangers may also be an air to exhaust heat exchanger.

The turbine may be a variable geometry turbine. Alternatively, the turbine may also be a fixed geometry or waste gated turbine. In addition, the fuel cell power module system may further comprise an intercooler or a humidifier. The one or more valves of the power generation system may be bypass valves or waste gate valves.

The fuel cell power module system may comprise an exhaust. The exhaust may also comprise an exhaust pipe or an exhaust throttle. The one or more fuel cells of the present fuel cell power module system may be a proton exchange membrane fuel cell.

In addition, the present disclosure is directed to a two-stage fuel cell power module system to enable robust exhaust energy extraction for high altitude operations, comprising: a low pressure air filter, a first, electrically-driven compressor positioned upstream of a second, mechanically-driven compressor, wherein the second, mechanically-driven compressor is coupled to a turbine, a first, air to exhaust heat exchanger positioned upstream of a second, air to liquid heat exchanger, one or more fuel cells, one or more bypass or wastegate valves, and an exhaust.

The high altitude of the present two-stage fuel cell power module system comprises altitudes ranging from about 100 to about 5000 meters above sea level. The turbine of the two-stage fuel cell power module system may be a variable geometry turbine or a fixed geometry turbine. The two-stage fuel cell power module system may further comprise components selected from the group consisting of an intercooler, a humidifier, an exhaust throttle, and an exhaust pipe. The one or more fuel cells of the present two-stage fuel cell power module system may be a proton exchange membrane fuel cell.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure is directed to a fuel cell power module and air handling system ("fuel cell power module system"). The fuel cell power module system of the present disclosure may comprise one or more fuel cell systems and/or one or more fuel cell stacks. The fuel cell power module system, the one or more fuel cell systems, and the one or more fuel cell stacks of the present disclosure may comprise one or more fuel cells.

The one or more fuel cells of the fuel cell power module system of the present disclosure may include, but are not limited to, a phosphoric acid fuel cell (PAFC), a molten carbonate fuel cell (MCFC), a proton exchange membrane fuel cell, also called a polymer exchange membrane fuel cell (PEMFC), and a solid oxide fuel cell (SOFC). In one embodiment, the fuel cell of the fuel cell power module system comprises, consists essentially of, or consists of a PEMFC, such as a PEMFC fueled by hydrogen (see FIG. 3).

Figure 3:
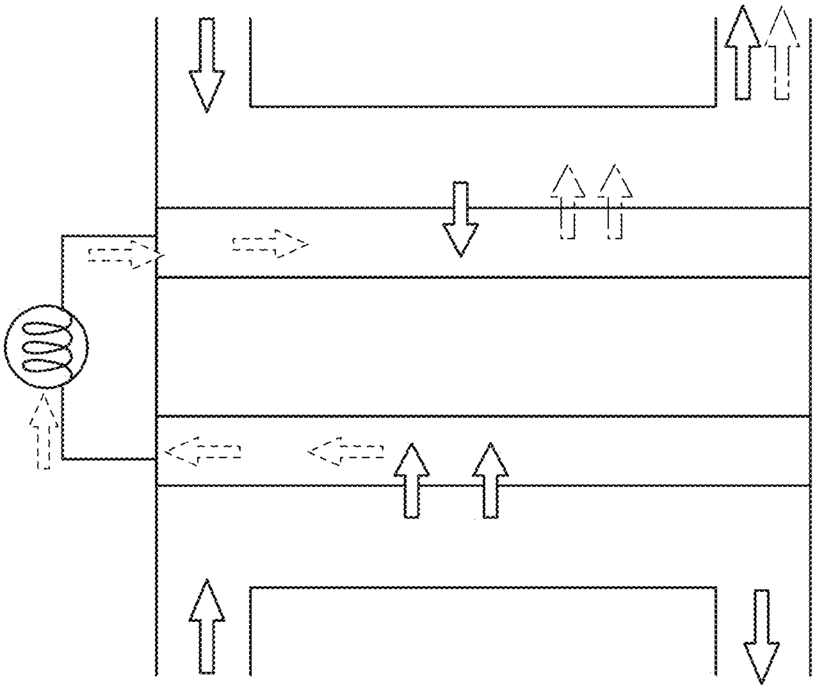
FIG. 3 is a schematic of a fuel cell, such as a proton exchange membrane or polymer exchange membrane fuel cell (PEMFC), comprised in an embodiment of the presently claimed fuel cell power module system.

PEMFCs are build out of membrane electrode assemblies (MEAs), comprising electrodes, electrolytes, catalysts (e.g., platinum or ceramic oxide), and gas diffusion layers (see FIG. 3). The electrolytes of PEMFCs comprise proton conducting polymer membranes that can be operated at high pressures and high temperatures typically ranging from about 50° C. to about 100° C. or 100° C. and above, and usually at or about 80-85° C. Lower pressure systems typically operate at lower temperatures (below 80° C.).

Fuel and air fed to the electrolytes of the PEMFCs undergo an electrochemical reactions that generate an electrical current (see FIG. 3). More specifically, an oxidation reaction of a fuel (e.g., a hydrogen fuel) at the anode of the fuel cell splits hydrogen into electrons and protons; this reaction may be improved using a catalyst. The hydrogen protons permeate the polymer electrolyte membrane and travel to the cathode side of the fuel cell. The electrons travel through an external load circuit to the cathode to generate power, such as electricity. The hydrogen protons, electrons, and oxygen molecules react at the cathode of the fuel cell to form water and waste heat as byproducts (see FIG. 3).

Fuel cells (e.g., PEMFCs) are generally stacked in series to form a fuel cell stack (FCS). PEM fuel cell stacks typically generate electrical power ranging from about 1-500 kW per stack, which is sufficient to operate transport equipment or motor vehicles, such as cars or trucks. For example, one or more PEMFCs or PEM fuel cell stacks of the present fuel cell power module system may be used to power vehicles, such as mining trucks that operate at high altitudes.

Particularly at high altitudes, fuel cell power module systems, including the fuel cells (e.g., PEMFCs) or fuel cell stacks (FCS) operate under higher than ambient internal air pressure (e.g., ranging from about 1 to about 4 bar absolute and any value or ranges including or within the range and/or endpoints.). Although this absolute pressure remains the same at high altitudes, the outside of the fuel cell is subjected to extremely low pressures. For example, low pressure at high altitudes may range from about 50 kPa at about 5500 m to about 24 kPa at about 10700 m above sea level, and any pressure values or ranges including or within those ranges and/or endpoints. Therefore, a fuel cell operating at such high altitudes must be able to withstand extreme differences in the internal and external pressure to which the fuel cell is exposed (e.g., the delta (Δ) pressure). The delta (Δ) pressure is the internal air pressure minus the external air pressure. More specifically, the fuel cell of the present fuel cell power module system must be able to withstand a maximum delta (Δ) pressure of about 5 bar. For example a maximum delta (Δ) pressure may be about 0.5, 1, 1.5, 2, 2.5, 3, 3.5, 4, 4.5 or 5 bar, and may range from about 0.5 to about 5 bar, and any pressure values or ranges including or within those endpoints.

In particular, the one or more fuel cells or fuel cell stacks of the present disclosure may comprise one or more seals. In one embodiment, the one or more seals must be able to withstand a maximum delta (Δ) pressure of about 5 bar by remaining air-tight with limited seepage. In another embodiment, the one or more seals ensure the fuel cell or fuel cell stacks of the fuel cell power module system are air-tight at a maximum delta (Δ) pressure of about 5 bar.

Operating the fuel cells below this maximum delta pressure allows the fuel cell to operate at a higher temperature, higher efficiency, and produce higher amperage (e.g., more power) at the same voltage, which increases power output at high altitudes. High altitudes for the present fuel cell power module system comprise, consist essentially of, or consist of altitudes ranging from about 100-10,000 meters (m) or 100-5000 m above sea level. In another embodiment, high altitudes comprise, consist essentially of, or consist of altitudes of at least 100 m, 200 m, 300 m, 400 m, 500 m, 600 m, 700 m, 800 m, 900 m, 1000 m, 1200 m, 1500 m, 1700 m, 2000 m, 2200 m, 2300 m, 2400 m, 2500 m, 3000 m, 3500 m, 4000 m, 4500 m or 5000 m above sea level. In another embodiment, high altitudes comprise, consist essentially of, or consist of altitudes ranging from about 1000 m to about 5000 m, from about 2200 m to about 5000 m, from about 2500 m to about 5000 m, from about 3000 m to about 5000 m, from about 4000 m to about 5000 m, at or about 5000 m, or greater than 5000 m above sea level.

In addition to the one or more fuel cells (e.g., PEMFCs), the fuel cell power module system of the present disclosure may also comprise several additional balance of plant (BOP) systems or components. For example, the instant fuel cell power module system may comprise one or more of the following components: a filter, a compressor, a motor, a bypass valve, a heat exchanger, a humidifier, a fuel cell, a fuel cell stack or system, a waste gate, an intake, an intake pipe, an intake valve, a turbine, an exhaust, an exhaust throttle, an intercooler, an exhaust valve, and an exhaust pipe. One embodiment of the present fuel cell power module system may comprise two or more of each of the following components: a compressor, a turbine, a heat exchanger, an air filter, a bypass and/or waste gate valves. In one embodiment, the present fuel cell power module system does not comprise one or more of the following components: a humidifier, a bypass valve, a wastegate valve, and/or an intercooler.

One or more of these components may be connected, configured, and/or coupled together in the fuel cell power module system. In an exemplary embodiment, components of the fuel cell power module system may be connected, configured, and/or coupled together in series so as to form a sealed and/or air-tight system for effectively moving, flowing, and/or handling of fluid in order to allow any excess or waste fluid, such as air, to exhaust or exit the system. Fluid may be flowed from one component at the beginning of the series (e.g., intake and/or air filter components) to and through intermediate components (e.g., compressor, heat exchanger, and bypass valve components). Fluid may continue from the beginning components to and/or through intermediate components and to and/or through final components at the end of the system series (e.g., wastegate valve, turbine, and exhaust components) to exhaust or exit the system.

In the present fuel cell power module system (see FIG. 4), the position of other components or features is defined based upon the position of the component or feature in relation to the fuel cell or fuel cell stack. For example, components or features located to the left of or before the fuel cell or fuel cell stack in series are referred to as being positioned in the "inlet stream" or "intake stream" of the fuel cell stack. Conversely, components or features located to the right of or after the fuel cell or fuel cell stack in series are referred to as being positioned in the "outlet stream" or "exhaust stream" of the fuel cell stack in the fuel cell power module system (see FIG. 3).

In addition, components or features located or positioned to the left of or before another component or feature in the intake stream of the fuel cell or fuel cell stack may be referred to as being "upstream" such component or feature in the intake stream. Conversely, components or features located to the right of or positioned after another component or feature in series in the intake stream of the fuel cell or fuel cell stack may be referred to as being "downstream" such component or feature in the intake stream. Similarly, components or features located or positioned to the right of or before another component or feature in the exhaust stream of the fuel cell or fuel cell stack may be referred to as being "upstream" such component or feature in the exhaust stream. Components or features located to the left of or positioned after another component or feature in series in the exhaust stream of the fuel cell or fuel cell stack may be referred to as being "downstream" such component or feature in the exhaust stream.

A fluid of the present disclosure may comprise, consist essentially of, or consist of any gas (e.g., a gas fluid), liquid (e.g., a liquid fluid), or oil (e.g., an oil fluid). Any such gas, oil, or liquid fluid may be comprised in a dispersion, a suspension, an emulsion, or some other mixed composition, comprising, consisting essentially of, or consisting of gas and liquid. In an exemplary embodiment, a fluid of the present disclosure is a gas.

In one embodiment, a fluid of the present disclosure is oxygen. In another embodiment, a fluid of the present disclosure is air. In a further embodiment, a fluid of the present disclosure is hydrogen.

In yet another embodiment, a fluid of the present disclosure is water. The water of the present invention may be any type of water. In one embodiment, the water is sterilized water. In another embodiment, the water is distilled water. In another embodiment, the water is deionized water, which specifically help to avoid, reduce, and/or prevent degradation of the claimed system components, or compositions.

In a separate embodiment, a fluid of the present disclosure is a cooling fluid or a coolant. The cooling fluid or coolant may by any fluid that externally interact with and/or is comprised by the air handling system of the present fuel cell power module system. In another embodiment, the cooling fluid or coolant is a fuel cell coolant.

Fluid valves or valves of the present fuel cell power module system may be any type of conduit known to allow a fluid to freely flow. Fluid valves of the present disclosure may comprise any size, shape, or dimensions known to enable the free flow of fluids, such as gases or liquids. Illustrative fluid valves of the present disclosure include modulated valves, butterfly, poppet, or puppet valves, radiological valves, and/or variable geometry valves.

An exemplary fluid valve provides a passageway for fluid (e.g., air or liquid) to flow without or with reduced or limited seepage, leakage, contamination, barriers, or obstructions. Fluid valves may be modulated or manipulated (e.g., partially or fully opened or closed) to direct, control, stop, start, or regulate the pressure, temperature, and/or flow of fluid in the system. In an exemplary embodiment, the fluid valves are sealed and/or airtight. In another embodiment, the fluid valves of the fuel power module work, independently or in combination with the seals, provide a sealed or airtight system that may withstand a maximum delta (Δ) pressure of about 5 bar The present fuel cell power module system may also comprise a filter. An exemplary filter of the system is an air filter. One embodiment of the air filter is a low pressure air filter.

In such an embodiment, the low pressure air filter of the present system may filter air flowing at a pressure drop of about 1 kPa or less, about 1 kPa, 2 kPa, 3 kPa, 4 kPa, 5 kPa, 6 kPa, 7 kPa, 8 kPa, 9 kPa, 10 kPa, 10 kPa or less, 15 kPa or less, or 25 kPa or less. In another embodiment, the ow pressure air filter may have a range of about 1-15 kPa, 1-10 kPa, 1-5 kPa, 5-10 kPa, 5-15 kPa, or 10-15 kPa. The air filter, typically located before or upstream a first compressor (CP1) in the intake stream, enables filtration of particulate matter and other contaminants detrimental to fuel cell operation out of ambient air entering the system in order to optimize performance Illustrative contaminants removed from the system via the air filter include, but are not limited to $H_2S$, NO, $NO_2$, CO, and $NH_3$.

Typically, upon entry into the present system, air comprises an air pressure or becomes pressurized. Ambient air is filtered to remove particles, particulates, and other contaminants that can be detrimental to a fuel cell power module system before the air reaches a single electrically powered compressor (CP1). The compressor (CP1) supplies the fuel cells or fuel cell stack with a gas (e.g., air) at a flow rate and pressure suitable for high pressure fuel cell operations. Thus, the fuel cell is operated under higher than ambient pressure by using a compressor (CP1) to supply the cathode system with reactants (e.g., oxygen, air, and/or modified air) that undergo reduction during the electrochemical reaction to produce electrical power (i.e., electricity).

Once filtered, the pressurized air typically flows from the air filter to a first compressor (CP1) in the intake stream via the fluid valves or passageways. The first compressor (CP1) may be coupled to a motor (e.g., an electrically driven compressor). The first compressor (CP1) may also be optionally coupled to a turbine (e.g., a mechanically driven compressor), such that the first compressor may be coupled to a motor and a turbine (see FIG. 4).

In one embodiment, the first compressor (CP1) is an electrically-driven compressor, meaning the compressor is driven by an electrical source (e.g., a motor). In exemplary embodiments, that electrical source or motor is external to the system, such that the first compressor (CP1) is electrically driven by an external source. More specifically, an electrically powered motor spins a shaft that spins a compressor wheel of the first compressor (CP1), such that the compressor is mechanically coupled to an electrically-driven motor. In other embodiments, the first compressor (CP1) may be electrically driven from the power or electricity of the parasitic load generated by the fuel cell or fuel cell stack from within the system (e.g., an internal source).

In a different embodiment, the first compressor (CP1) is a mechanically-driven compressor. In this embodiment, the first compressor (CP1) is mechanically coupled to a turbine driven by a pneumatic source. More specifically, the first compressor (CP1) is mechanically coupled to a turbine, through which fluid flows, that is pneumatically driven by energy generated from within the system (e.g., an internal source).

Importantly, in one embodiment, the present fuel cell power module system may comprise, consist essentially of, or consist of two or more compressors (CP1 and CP2), which is referred to as a two-phase or "two-stage" fuel cell power module and fluid (e.g., air) handling control system. In one embodiment of the two-stage fuel cell power module system, the second compressor (CP2) is an electrically-driven compressor. In a different embodiment of the two-stage fuel cell power module system, the second compressor (CP2) is a mechanically-driven compressor.

Figure 4:
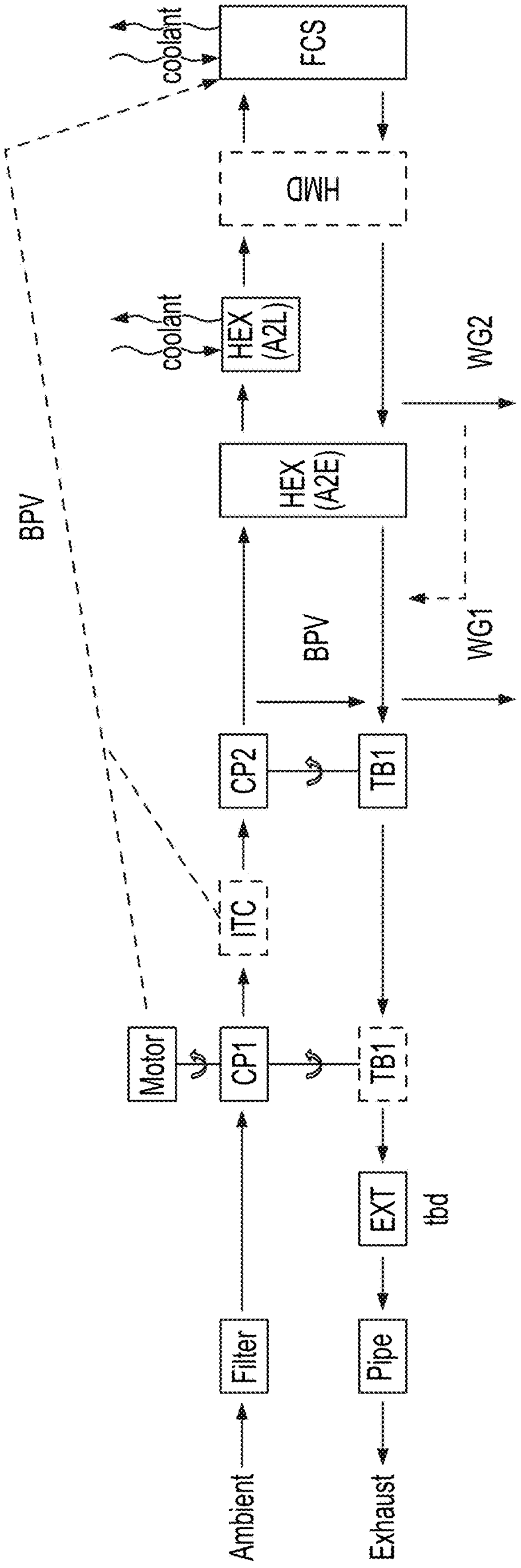
FIG. 4 is a schematic of one embodiment of the claimed fuel cell power module and air handling system of the present disclosure.

More specifically, one embodiment of the present two-stage fuel cell power module system comprising two compressors may further comprise two electrically-driven compressors, two mechanically-driven compressors, or one electrically-driven compressor along with one mechanically-driven compressor (see FIG. 4). In an illustrative embodiment, the two-stage fuel cell power module system of the present disclosure comprises an electrically-driven compressor along with a mechanically-driven compressor. An exemplary embodiment of this two-stage fuel cell power module system comprises a first, electrically-driven compressor (CP1) along with a second, mechanically-driven compressor (CP2).

In addition, the first, electrically-driven compressor (CP1) may be positioned upstream of the second, mechanically-driven compressor (CP2) in the intake stream of an embodiment of the present two-stage fuel cell power module system (FIG. 4). In this embodiment, air flows directly from the first, electrically-driven compressor (CP1) to the second, mechanically-driven compressor (CP2) of the present two-stage fuel cell power module system. In another embodiment of the present two-stage fuel cell power module, the first, electrically-driven compressor (CP1) may be positioned downstream of the second, mechanically-driven compressor (CP2) in the intake stream. In this embodiment, air flows directly from the second, mechanically-driven compressor (CP2) to the first, electrically-driven compressor (CP1) of the present two-stage fuel cell power module system. Still further, the first or second compressors of the fuel cell power module air handling system may be any type of compressor known in the art to sufficiently compress air as required in the present system, such as centrifugal compressors (e.g., often used for automobiles or trucks) or axial compressors (e.g., often used for jets or airplanes).

In one embodiment of this two-stage fuel cell power module system comprising at least two compressors, the first, electrically-driven compressor (CP1) may be coupled to a motor, and optionally, further coupled to a kinetic energy recovery (KER) device. This kinetic energy recovery (KER) device can take high pressure and high temperature fluids (e.g., air and/or water vapor) and decompress it while extracting mechanical work. Preferred embodiments of KER devices comprise a turbocharger or one or more turbine stages of a turbocharger (i.e., a turbine).

It is possible to have an embodiment comprising multiple turbines in the system, including one turbine (TB1) coupled to two compressors (CP1 and CP2). Another embodiment may comprise, consist essentially of, or consist of a single turbine (TB1) coupled to a single compressor (CP1) or (CP2) in order to extract as much energy out of the system by that single turbine (TB1) as efficiently as possible (see FIG. 4). In a preferred embodiment, the mechanically-driven compressor (CP2) is coupled to a single turbine (TB1) wheel.

In a further embodiment of the two-stage fuel cell power module air handling system, an additional component or feature may be positioned between the first and second compressors, such that air flows from the first or second compressor through the additional component or feature and further into the second or first compressor, respectively (FIG. 4). For example, an intercooler (ITC) may be positioned directly between the first compressor (CP1) and second compressor (CP2) components. In such an embodiment, the intercooler (ITC) comprises a coolant that is used to cool the hot air temperature (e.g., ranging from about 150° C. to about 200° C.) coming from the first compressor (CP1) and flowing to the second compressor (CP2). The intercooler (ITC) beneficially maintains the temperature of air flowing from the first or second compressors to less than or about 85° C. As such, the intercooler (ITC) is an important, yet optional component of the present system, since it is known in the art that it is more efficient to compress cool or cold air than to compress hot air. Air from the first compressor (CP1) or the second compressor (CP2) flows to one or more heat exchangers (HEX; see FIG. 4). More specifically, air leaving the first compressor (CP1) and motor and/or the second compressor (CP2) is then cooled with a coolant in a heat exchanger (HEX) before proceeding on to the fuel cell stack (FCS).

Managing and controlling the present in the present fuel cell power module system is also important. Pressure may be managed or controlled on the anode and cathode side of the fuel cell. Notably, the anode side of the fuel cell, fuel cell stack, or fuel cell system is typically also pressurized to balance forces across the membranes of the fuel cell. For example, the anode side of the fuel cell may be maintained at 1-20 kPa higher pressure than the cathode side. The higher anode side pressure helps to prevent oxygen from entering the anode side. Anode side pressure control can be affected by way of a hydrogen supply regulator and/or a backpressure valve with forward or backward pressure following.

On the cathode side, control devices, such as bypass lines/valves and/or backpressure valves may also be added to the present system to maintain a desirable pressure (e.g., backpressure) in the cathode side of the fuel cell and to facilitate start up and shut down procedures. A bypass valve (BPV) may be positioned between the first compressor (CP1) and the second compressors (CP2). Alternatively, in one embodiment, a bypass valve (BPV) is not positioned between the first compressor (CP1) and the second compressor (CP2) of the present fuel cell power module system. In an exemplary embodiment, a bypass valve (BPV) may be incorporated into the system after the first (CP1) or second compressor (CP2) and before the one or more heat exchangers (HEX; see FIG. 4).

More specifically, a bypass valve (BPV) may be positioned between the first (CP1) or second compressor (CP2) and a first heat exchanger (HEX). Alternatively, it should be noted that a bypass valve (BPV) may be positioned to connect the first compressor (CP1), the second compressor (CP2), or the intercooler (ITC) directly to the one or more fuel cells or fuel cell stacks (see FIG. 4). This direct connection of a compressor (CP1 or CP2) or the intercooler (ITC) directly to the fuel cells or fuel cell stack (FCS) reverses the effects of nitrogen blanketing, a process to purge the system with nitrogen in order to stop or arrest system function, by awakening the system with a direct infusion of air or oxygen in preparation for operation mode.

The primary purpose of the fluid valves, such as bypass valves (BPV), of the present system is to relieve pressure of air coming from the compressor into the system in order to reduce or avoid surge. Under certain operating conditions, combinations of air flow, pressure, and high temperatures can lead to issues such as surge. Surge is an aerodynamic instability that can occur within compressors as the compression ratio is increased at a given air mass flow rate. Surge is a common limitation of fuel cell power module systems in the art that is overcome by the presently described fuel cell power module and air handling system, partly through the use of fluid valves, such bypass valves (BPV) and wastegate valves (WGV). In particular, the bypass valve (BPV) helps move mass flow of high temperature air coming from the compressors (CP1 and/or CP2) into the exhaust stream of the turbine (TB1) to more efficiently extract energy from the exhaust air in order to reduce parasitic load, which increases as power and mass air flow increase (see FIG. 4).

Heat exchangers (HEX) are incorporated into the present fuel cell power module system to take the excess or waste heat generated by compression of the intake air in the system (e.g., up to at or about 200° C.), and cool it down to a temperature at or near the operating temperature of the fuel cell stack. Typically, the heat exchanger will cool the intake air to within about 5° C. of the operating temperature (e.g., 60° C.-100° C.), so that the cooled air may be used in the fuel cell or fuel cell stack (FCS). Doing so, avoids circumstances and situations that are detrimental to fuel cell operation and life (e.g., overdry inlet, relative humidity, temperature gradients, etc.).

Heat exchangers (HEX) also extract energy from the waste heat utilizing the turbine (TB1) to reduce parasitic load. One embodiment of the present two-stage fuel cell power module air handling system may comprise, consist essentially of, or consist of one heat exchanger (HEX). In a preferred embodiment, the one heat exchanger (HEX) is an air to exhaust (A2E) heat exchanger that transfers heat from air to the exhaust. In another embodiment, the one heat exchanger (HEX) is an air to exhaust (A2E), an air to liquid (A2L), or an air to air (A2A) heat exchanger. One embodiment of an air to liquid (A2L) heat exchanger is a gas to liquid heat exchanger (G-L HX).

One embodiment of an air to air (A2A) heat exchanger is a gas to gas heat exchanger (G-G HX). The G-G HX may be, for example, a shell and tube heat exchanger. Alternatively, the gas to gas heat exchanger (G-G HX) may be a bar and plate heat exchanger with appropriate ducts added, if not already provided, for the supply and collection of the gas streams.

A further embodiment of the present system may comprise, consist essentially of, or consist of two heat exchangers (HEX). One embodiment of the present system may comprise at least two heat exchangers (HEX). A preferred embodiment of the present system may comprise, consist essentially of, or consist of two or more heat exchangers (HEX).

More specifically, one embodiment of the present fuel cell power module system comprising two heat exchangers (HEX) may further comprise two air to exhaust (A2E) heat exchangers, two air to liquid (A2L) heat exchangers, two air to air (A2A) heat exchangers, or any combinations thereof. For example, a preferred embodiment of the present system comprises one air to exhaust (A2E) heat exchanger along with one air to liquid (A2L) heat exchanger (see FIG. 4). In an exemplary embodiment, the fuel cell power module system of the present disclosure comprises, consists essentially of, or consists of a first, air to exhaust (A2E) heat exchanger (HEX) along with a second, air to liquid (A2L) heat exchanger (HEX).

The first, air to exhaust (A2E) heat exchanger (HEX) may be positioned before the second, air to liquid (A2L) heat exchanger (HEX) in the intake stream of one embodiment of the present two-stage fuel cell power module system (see FIG. 4). In this (A2E-A2L) heat exchanger embodiment, intake air flows from the first, air to exhaust (A2E) heat exchanger (HEX) to and through the second, air to liquid (A2L) heat exchanger (HEX) toward the fuel cell and fuel cell stack. In this same (A2E-A2L) heat exchanger embodiment the first, air to exhaust (A2E) heat exchanger (HEX) may be positioned after the second, air to liquid (A2L) heat exchanger (HEX) in the exhaust stream of the system, such that after traveling through the fuel cell stack, the exhaust stream may also pass to and through the first, second, or both heat exchangers (HEX). In the (A2E-A2L) heat exchanger embodiment of FIG. 4, the intake air stream passes through both the first, air to exhaust (A2E) heat exchanger (HEX) and the second, air to liquid (A2L) heat exchanger (HEX), but the fuel cell exhaust stream only passes through the first, air to exhaust (A2E) heat exchanger (HEX), and does not pass through the second, air to liquid (A2L) heat exchanger (HEX).

In a separate (A2L-A2E) embodiment of the present two-stage fuel cell power module system (not shown), the air to exhaust (A2E) heat exchanger (HEX) may be positioned after the second, air to liquid (A2L) heat exchanger (HEX) in the intake air stream. In this (A2L-A2E) embodiment, air flows from the second, air to liquid (A2L) heat exchanger (HEX) to the first, air to exhaust (A2E) heat exchanger (HEX). While this (A2L-A2E) heat exchanger embodiment is operationally functional, it is would likely result in a loss of the amount of waste energy recovered by the system as compared to an (A2E-A2L) embodiment. However, this (A2L-A2E) embodiment may find particular use with a reduced temperature (e.g., less than 80° C.) to protect the heat exchanger, such as an embodiment with the intercooler (ITC) positioned between the first and second compressors (CP1 and CP2).

In the present fuel cell power module system, pressurized air continues to flow from the one or more heat exchanger (HEX) to and through the one or more fuel cells or fuel cell stacks (FCS). Prior to reaching the fuel cells or fuel cell stacks, intake air stream may first pass through a humidifier (HMD). A humidifier (HMD) is an optional component of the present fuel cell power module system.

Importantly, air flow, air pressure, temperature, and fuel consumption, independently or in combination, are several of the necessary parameters that must be monitored and regulated to provide the proper relative humidity (e.g., RH at or about 1) to ensure robust fuel cell power module system performance and exhaust energy extraction at high altitudes. Air released from the fuel cell stack (FCS) must consistently remain at a specific RH range to avoid detriment to the system. A humidifier helps regulate the relative humidity in the system in order to reduce and/or prevent degradation of the system.

When incorporated into the present fuel cell power module system, the humidifier (HMD) is typically positioned so that the intake stream and the exhaust stream pass through it. In one embodiment, the humidified (HMD) is located after the one or more heat exchangers in the intake stream (see FIG. 4). In the same or another embodiment, the humidifier may be positioned in series before the one or more heat exchangers in the exhaust stream.

By recirculating water from the fuel cell system, the humidifier (HMD) provides an additional water control system or mechanism to manage the fuel cell stack membrane electrode assemblies (MEA) humidity, such as its relative humidity (RH) levels. The humidifier (HMD) also increases the degrees of heat or superheat in the exhaust stream, such that additional energy may be extracted from the heat (e.g., via the turbines) before water condensation can occur.

The exhaust air exits the one or more fuel cells or fuel cell stacks and the optional humidifier (HMD) into the exhaust stream toward exit of the system. One or more waste gate valves (WGV) may be positioned in the exhaust stream of the present fuel cell power module system. In one embodiment, the system comprises at last two, about two, or two or more waste gate valves (WGV). In one embodiment, the system comprises two waste gate valves, a first waste gate valve (WG1) and a second waste gate valve (WG2).

The waste gate valves (WG1 and WG2) help address fluid condensation issues by increasing the fluid flow area to reduce back pressure across the one or more turbines (TB1). In one embodiment of the present fuel cell power module system, one waste gate valve (WG1) is sufficient. Alternatively, two or more waste gate valves (WG1 and WG2) may be incorporated in the exhaust stream of the present system (see FIG. 4).

In these embodiments, at least one waste gate valve (WG1) may be positioned in the exhaust stream after the fuel cell or fuel cell stack, the optional humidifier, and/or one or more heat exchangers (HEX). For example, the first waste gate valve (WG1) may be positioned after the fuel cell or fuel cell stack, the optional humidifier, and the air to exhaust (A2E) heat exchanger in the exhaust stream of the system (see FIG. 4). In the same or a different embodiment, the second waste gate valve may be positioned in the exhaust stream of the system after the fuel cell or fuel cell stack, the optional humidifier, and the air to liquid (A2L) heat exchanger (located in the opposite intake stream; see FIG. 4). For example, one waste gate (WG2) valve may be located upstream of the air to exhaust (A2E) heat exchanger and after the fuel cell stack (FCS) in the exhaust stream (see FIG. 4).

In most system embodiments, the waste gate valves (WG1 and WG2) will be positioned before the one or more turbines (TB1) in the exhaust stream. The one or more turbines (TB1) of the present fuel cell power module system help control the exhaust flow (e.g., air flow) rate. As more exhaust flows through the system, the pressure increases due to system flow restrictions, and so does the energy. One mechanism to recover energy from the exhaust flow is by implementing turbines. At this point in the claimed system, oxygen ($O_2$) in the air of the exhaust flow has likely been consumed and water has been added to the waste heat and air.

Turbines (TB1) of the present system may comprise complex, more expensive variable geometry turbines that can be manipulated to open or close "vanes" of the turbine in order to effect exhaust flow (e.g., air flow). Alternatively, turbines (TB1) of the present system may comprise simpler, less expensive fixed geometry or waste gated turbines. Both types of turbines efficiently and effectively extract exhaust energy from the exhaust stream over the fuel cell operating temperature range in order to reduce parasitic load needed to control the exhaust flow rate. Addition of a second heat exchanger to the system also helps improve efficiency of energy extraction from waste heat through the one or more turbines (TB1) so the parasitic load of the fuel cell power module system is reduced.

Parasitic load is the amount of electricity or power consumed and/or required by auxiliary power-consuming devices that supports electricity generation. Parasitic load is highly responsible for the inability of fuel cell power module systems to operate at high altitudes. As such, it is advantageous to the life of fuel cell systems to reduce or minimize parasitic load as much as possible through implementation of turbines mechanically coupled to one or more compressors.

The exhaust air travels the exhaust stream through one or more turbines, where energy is extracted, prior to exiting through an exhaust system (see FIG. 4). The exhaust system of the present system may comprise an exhaust. The exhaust comprises an exhaust throttle (EXT) and/or an exhaust pipe (see FIG. 4).

The exhaust throttle (EXT) of the exhaust system is a lid or such type of an apparatus that may be positioned over a valve, passageway, or pipe of the present system through which fluid, such as air or fuel, may flow. Generally, the exhaust throttle remains in the closed position to provide a back pressure to the air in the system, and thus enables pressurized fluid flow (e.g., air flow). In doing so, the exhaust throttle (EXT) is able to regulate or hold fuel cell power module system operational pressures and to restrict exhaust flow within the system. In particular, the exhaust throttle (EXT) regulates and/or restricts exhaust or fluid flow (e.g., air flow) from the compressor (CP1) and fuel cell stack (FCS) in order to ensure proper functionality of the fuel cell power module system (see FIG. 4).

As such, the present disclosure is directed to fuel cell power module systems and air handling configurations, as described, for operation at higher altitudes. The present system provides several advantages over systems known in the art. More specifically, the fuel cell power module system described herein comprising components and features, including, but not limited to the two-stage compressors, air filter, one more valves (e.g., bypass and waste gate valves), turbines, heat exchangers, exhaust, and an optional humidifier, provide advantages for increased extraction and conservation of energy of the present system.

Operating the present fuel cell power module system at elevated pressures of the reactant gasses allows for sustainable operation at extreme temperatures (e.g., high pressure reactant gasses can enable fuel cell operation temperatures upwards of about 30° C. above low pressure fuel cell operations). Higher pressure and temperature operations of a fuel cell, stack, or system (e.g., PEMFC) increases the cell energy density. The fuel cell is therefore able to produce more power for a given physical size.

Additionally, the present fuel cell power module system may further comprise a heat rejection system (i.e., a cooling system) or corresponding cooling devices, such as a radiator or other comparable cooling devices, that may be coupled with the present technology to provide smaller per unit of power output due to the increase in temperature difference between the coolant leaving the fuel cell and the ambient environment. These benefits are particularly useful in mobile applications, such as cars, trucks, and other vehicles, particularly when operating at high altitude conditions. In order to operate at a power density useful for size restricted mobile applications, the compressor operating pressure is high enough to create excess heat and/or pressure in the cathode exhaust gas that may be beneficial.

In particular, the present fuel cell power module and air handling system is able to extract, conserve, and/or return about 40% of the energy required to drive the compressors (e.g., the parasitic load) from the exhaust stream. In other words the pressure return system of the present fuel cell power module system is able to reduce the parasitic load of the present system by about 50%, which is advantageous to the cost and efficiency of the overall system. Specifically, the size and cost of the one or more compressors of the present system may be significantly reduced.

More specifically, it is estimated that about 10% or more of the energy in the cathode exhaust can be recovered by the one or more heat exchangers (e.g., G-G HX) of the present fuel cell power module and air handling system. For example, a KER (e.g., turbine) in the cathode exhaust stream may recover about 40% of the energy in the cathode exhaust when one or more heat exchangers (e.g., G-G HX) is not present. Alternatively, the present system may recover about 50% of the energy in the cathode exhaust when the turbine and the one or more heat exchangers (e.g., A2E, A2L, A2A, or G-G HX) is present in the system.

Since the energy consumed by the compressor of the system is significant (e.g., about 30 kW compressor parasitic load is necessary to produce about 130 kW gross fuel cell system resulting in about 100 kW of net fuel cell power), 10% additional savings and/or extraction of the amount of energy in the cathode exhaust gas by the present system is significant. Further, at least in cases where the KER is a single stage turbine, water droplets in the cathode exhaust are vaporized in the one or more heat exchangers (e.g., A2E, A2L, A2A, or G-G HX) and do not revert to a liquid when the cathode exhaust is cooled and expanded in the turbine.

In addition, the ability to incorporate a first (CP1) and second compressor (CP2) to form the present two-stage compression system, coupled to a turbine (TB1) enables the instant fluid and air handling system to accommodate operations at higher altitudes. This two-stage fuel cell power module system provides more flexibility than systems known in the art to manage the compression temperature, both the compression internal temperature (e.g., CIT) and the compression external temperature (e.g., COT) via one or more heat exchangers (HEX) or an intercooler (ITC).

The ability for the compression or pressure ratios across each compressor of the fuel cell power module system to remain low at similar corrected compressor mass inlet flows (MIFs), provides another advantage of the present system to avoid surge issues and problems. The fuel cell power module system of the present disclosure also provides the ability to mitigate surge at part load, and targets reduction of parasitic load by efficiently extracting exhaust energy while avoiding water condensation within the system. All of these features attributed by the combination of components comprised by the present fuel cell power module system provide unexpected advantages, benefits, results, and technical improvements over systems known in the art.

Importantly, the fuel cell power module and air handling system of the present disclosure may comprise, consist essentially of, or consist of a balance of power (BOP) system. In an exemplary embodiment, components of the fuel cell power module system may be connected, configured, and/or coupled together to the BOP. This BOP may comprise, consist essentially of, or consist of one or more additional, likely smaller systems to handle different components of fluid flow and transfer.

For example, in addition to the fuel cell system described in detail above, the present fuel cell power module system may comprise additional BOP components, features, or systems to separately, independently, or in combination control the valves, pressure (e.g., fluid or air pressure), heating and cooling, water condensation, temperature, exhaust, humidity, etc. In some embodiments, the BOP of the fuel cell power module system further comprises one or more valving control systems, fluid control and/or air handling systems, pressure control systems, heating and/or cooling systems, exhaust systems. fuel handling and/or delivery systems, temperature, water, and/or humidity control systems, and wiring and/or electronic systems, including external power electronics systems.

Methods of the present disclosure comprise operating the fuel cell power module and air handling system described herein. In particular, methods of operating a two-stage fuel cell power module system for robust operation at high altitudes is encompassed. More specifically, methods of operating the fuel cell power module and fluid handling system of the present disclosure include, but are not limited to one or more of the following: 1) intaking fluid into an intake stream of the fuel cell power module and fluid handling system, 2) filtering the fluid, 3) compressing the fluid, 4) heating the fluid, 6) bypassing the fluid from the intake stream to the exhaust stream, 7) cooling the fluid, 9) exchanging the heated fluid for cool fluid, 10) humidifying the fluid, 11) reacting the fluid, 12) waste gating the fluid, 12) extracting energy from the exhaust fluid, and 13) exhausting the fluid. In one embodiment, a method of operating the fuel cell power module system of the present disclosure may comprise any combination and repetition of the one or more steps described herein.

More specifically, an exemplary method of operating the fuel cell power module and fluid handling system of the present disclosure includes, but is not limited to one or more of the following: 1) intaking air into an intake stream of the fuel cell power module and air handling system, 2) filtering the air with one or more air filters, 3) compressing the air with one or more compressors (CP1 and CP2), 4) heating the air with one or more compressors, 6) bypassing the air from the intake stream to the exhaust stream with one or more bypass valves (BPV), 7) cooling the air with coolants and/or an intercooler (ITC), 9) exchanging the heated air for cool air with one or more heat exchangers (HEX), 10) humidifying the air with a humidifier (HMD), 11) reacting the air in one or more fuel cells or fuel cells stacks (FCS), 12) waste gating the air with one or more waste gate valves (WG1 and WG2), 12) extracting energy from the exhaust air with one or more turbines (TB1), and 13) exhausting the air via an exhaust system comprising an exhaust, an exhaust throttle (EXT), and/or an exhaust pipe.

The present disclosure describes fuel cell power module air handling systems that target high efficiency and high net power operation. As such, the methods of the present disclosure are intended to enable operation of the fuel cell power module system and the two-stage fuel cell power module system to robustly enable exhaust energy extraction to occur at high altitudes ensuring that mechanical limits (e.g., surge, wheel speed, temperature, and condensation) are not violated.

EXAMPLES

Illustrative embodiments of the compositions, systems, components, and/or methods of the present disclosure are provided by way of examples. While the concepts and technology of the present disclosure are susceptible to broad application, various modifications, and alternative forms, specific embodiments will be described here in detail. It should be understood, however, that there is no intent to limit the concepts of the present disclosure to the particular forms disclosed, but on the contrary, the intention is to cover all modifications, equivalents, and alternatives consistent with the present disclosure and the appended claims. The following experiments were conducted to determine the effects of each component on the functionality and capacity of the present fuel cell power module system and air handling system to operate in high altitude environments.

Example 1: Low Pressure Air Filter Mitigates Pressure Loss at High Altitudes To accommodate high altitude (1000-5000 meters above sea level) operations of fuel cells systems, because of high compression ratio requirements, the loss in pressure across the different system components is important. Pressure loss is particularly important for system components not under pressurized operation. For example, any pressure losses in the air filter has two effects: pressure losses at low ambient pressure increase due to higher velocity of gas flow, which means the denominator decreases.

For example, if a fuel cell systems targets a 2.5 bar operating pressure, the compression ratio (CR) at sea level=(2.5+□p_hex)/(1−□p_flt). If Dp_hex=15 kPa and Dp_flt=10 kPa at sea level, the CR=2.9.

At altitude (3500 m, p_amb=64.4 kPa), assume effective flow area (EFA) is constant for the heat exchanger (HEX) and the air filter. If Dp_hex=15 kPa and Dp_flt=15 kPa at sea level, the CR=5.4.

At altitude (5000 m, p_amb=51.1 kPa), assume EFA is constant for the heat exchanger (HEX) and the air filter. If Dp_hex=15 kPa and Dp_flt=19 kPa at sea level, the CR=8.3.

Assume EFA of the air filter is increased such that pressure losses are reduced by 2. At altitude (5000 m, p_amb=51.1 kPa), assume EFA=2× Nominal EFA. If Dp_hex=15 kPa and Dp_flt=10 kPa at sea level, the CR=6.4. A compression ratio (CR) of 6.4 is manageable for fuel cell power module system operations at high altitudes.

As such, the low pressure air filter of the present fuel cell power module system provides a solution to fuel cell air handling challenges at high altitudes, including a design and/or functional component (e.g., the air filter) for low pressure loss at high altitude. In combination with other components, such as the dual compressors, the humidifier, and/or the intercooler, the low pressure air filter component of the present invention provides advantages over other systems (e.g., baseline and improve configurations) known in the art.

Figure 1:
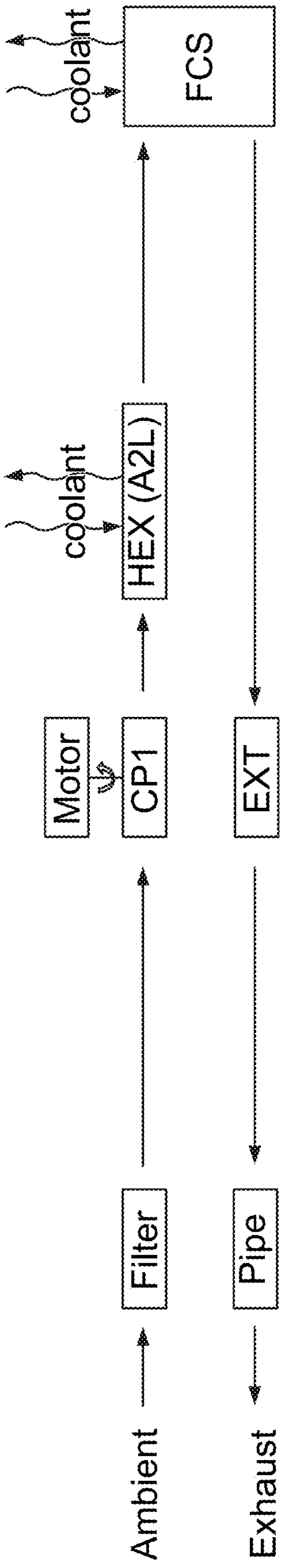
FIG. 1 is a schematic of a baseline system configuration known in the art.
Figure 2A:
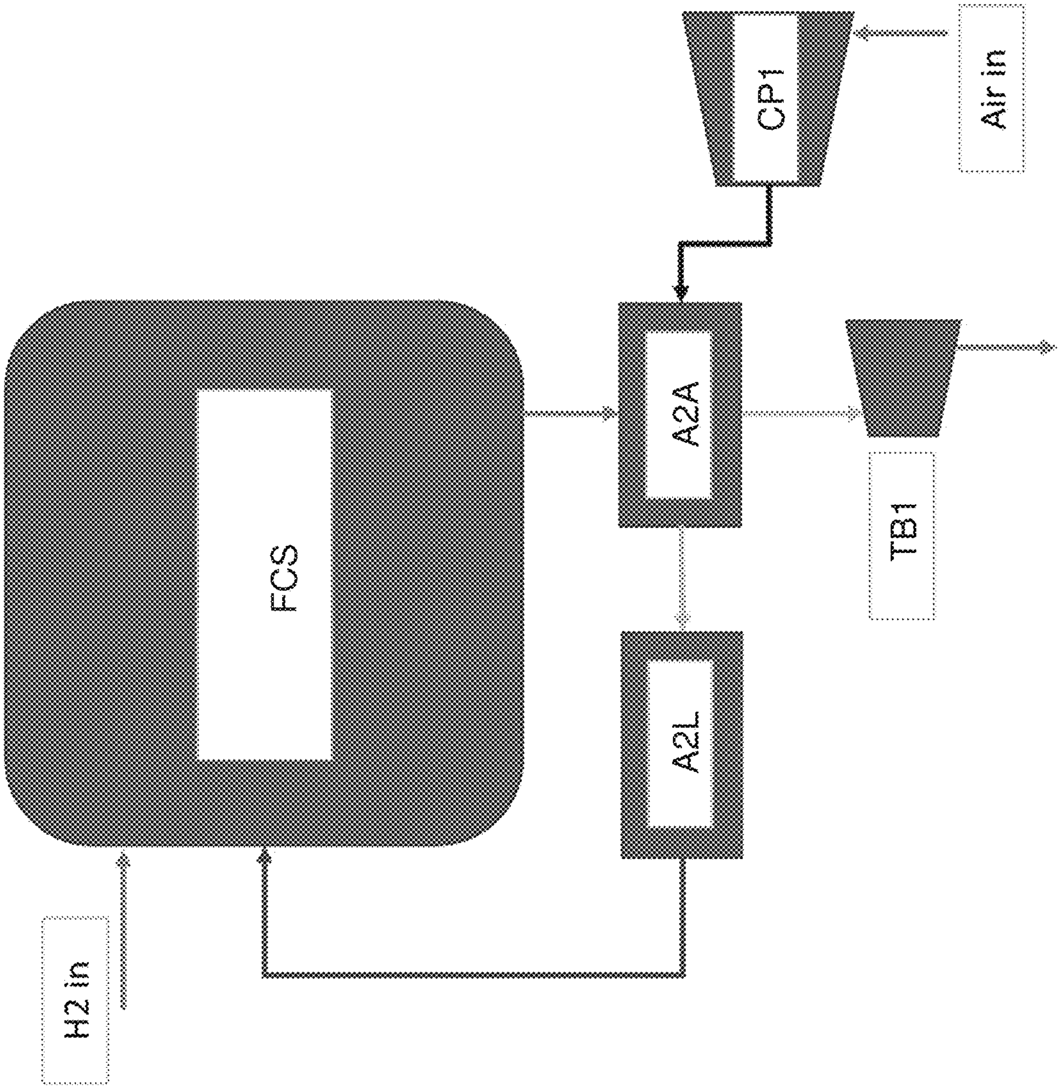
FIG. 2A is a schematic of one embodiment of an improved system configuration known in the art.
Figure 2B:
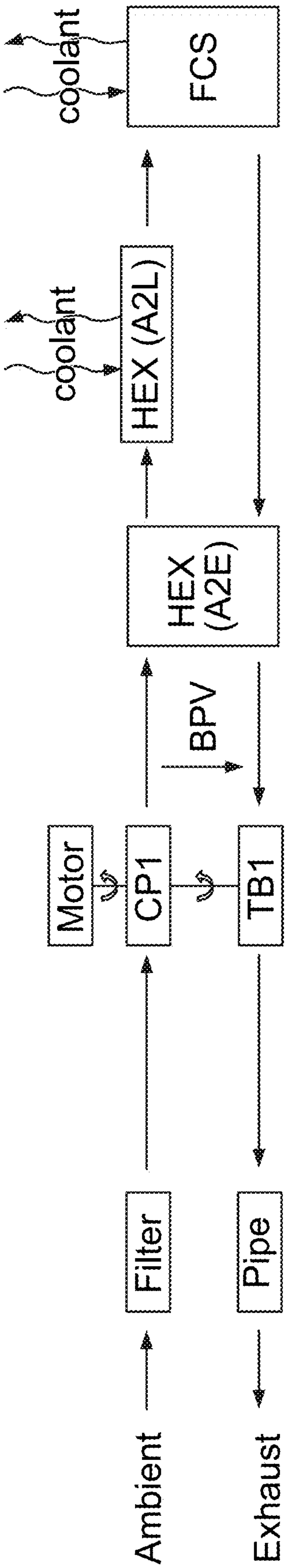
FIG. 2B is a schematic of another embodiment of an improved system configuration known in the art.

Example 2: Mechanically-Driven Compressor Coupled to a Turbine Positively Affects Efficient Extraction of Exhaust Energy In system embodiments comprising a mechanically connected turbine (TB1) with the first compressor (CP1), as indicated in the baseline and improved system configurations (see FIGS. 2A, 2B, and 3), the present inventors have discovered that these systems significantly degrade the system's ability to extract energy efficiently. More specifically, the turbine wheel and sizing target to acquire a turbine blade speed ratio (BSR) of approximately 0.7, which is ideal for efficient operation. The blade speed ratio (BSR) is equivalent to the thermodynamic velocity of enthalpy extracted by the turbine over the rotor tip speed of the turbine wheel EFA of the turbine housing.

Figure 5:
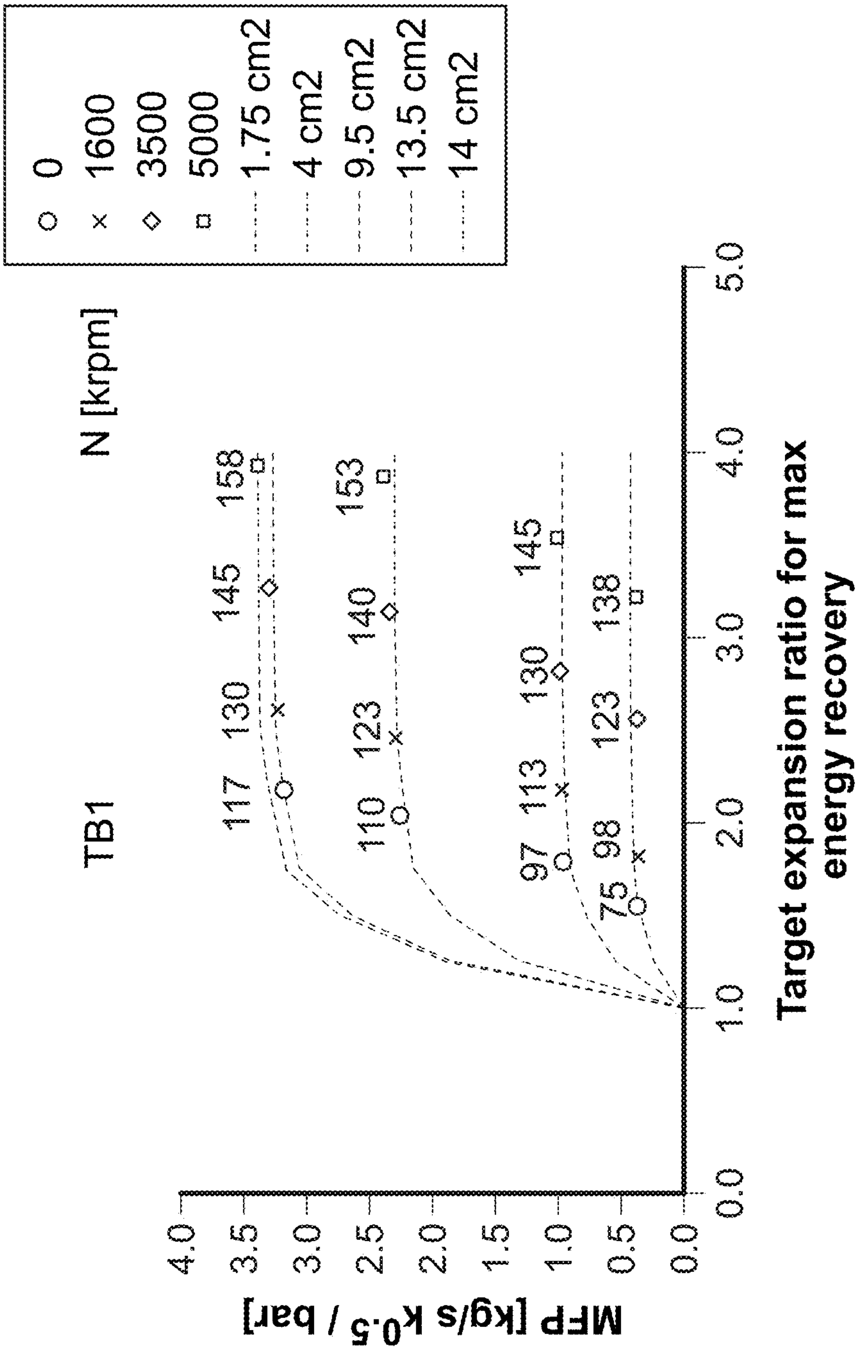
FIG. 5 is a graph demonstrating the target expansion ratio for max energy recovery of turbines.

Referring now to FIG. 5, shown on the graph are turbine wheel speeds with the wheel diameter being 40 mm and the blade speed ratio (BSR) being 0.7 for optimal operation of the turbine. FIG. 5 demonstrates that system embodiments comprising the mechanically coupled turbine and the electrically-driven compressor result in the electric motor driving the compressor harder to increases the turbine wheel speed to 30-50% over what the turbine would rotate naturally. Such embodiments therefore require smaller turbine wheel, but the flow requirements limit the turbine wheel diameter to at or about 40 mm or greater.

So, assuming the wheel diameter was kept at the 40 mm diameter, the electric drive of the turbine would force the turbine blade speed ratio (BSR) to increase. So, the mechanical coupling of the turbine to operate at a suboptimal operating speed, causes significant degradation in the ability of the system to extract exhaust energy. In fact, this embodiment of the system would extract in the range 33-60% less energy, forcing the electric drive to make up the difference.

To address this issue, one embodiment of the present fuel cell power module system decouples the turbine (TB1) from the first compressor (CP1). In addition, the turbine (TB1) may be connected to a motor-generator to convert the mechanical energy to electrical energy. Alternatively, another embodiment of the present fuel cell power module system comprises an additional or a second compressor (CP2) in series with the first compressor (CP1). In a preferred embodiment, this second, mechanically-driven compressor could be coupled to the turbine (TB1) wheel to provide the present two-stage compression fuel cell power module system, as described herein.

An advantage of mechanically coupling the second compressor (CP2) to the turbine (TB1) is that it enables the air handling system to be capable of accommodating operation at higher altitudes. More specifically, the inclusion of an additional or second compressor (CP2) to provide the present two-stage compression system and process would be multiplicative. In other words, while a single compressor (CP1) would only allow for low compression rates (e.g., about 3-4 max), the addition of an additional or second compressor (CP2) provides compression ratios of 5 or greater (e.g., about 6-8 max). Since it is known in the art that obtaining compression or pressure ratios over about 3-4 is very difficult with a single compressor, the addition of a second compressor (CP2) in the present fuel cell power module system increases the compression ratio to about 6-8 (e.g., about 7), such that the system may be robustly and properly operated at high altitudes without degradation at all or rapid degradation as observed in the baseline or improved configurations.

In addition, the pressure or compression reaction required across each of the two compressors would be lower at the same corrected compressor mass flow rate. This advantageously prevents or reduces surge issues in the fuel cell power module system. Overall, the present two-stage fuel cell power module system comprising, consisting essentially of, or consisting of two compressors provides more flexibility to manage the system components, including the optional intercooler (ITC) and humidifier (HMD; see FIG. 4).

Example 3: An Intercooler or Second Heat Exchanger Helps Manage Compressor Temperature Limits With introduction of a second compressor (CP2) to the present fuel cell power module system (as described in Example 2) to provide increased compression ratios for operation at high altitudes, the temperature of the one or more compressors must be managed. Compressor outlet or operating temperatures (COT) of the present system should not exceed about 175-200° C. Maintaining an acceptable temperature range of the present system during high altitude operation becomes an issue at or above altitudes of about 3000 m above sea level.

In one embodiment, a cooling jacket component may be introduced to the system to manage the compressor temperature. In another embodiment, an intercooler component may be introduced to the system to manage the compressor temperature. An intercooler may be incorporated into the present system to keep the internal, outgoing, and/or operating temperature of a compressor at or below about 85° C.

The intercooler (ITC) may be positioned in the system series upstream of the compressor for which it is to manage the temperature. Alternatively, the intercooler (ITC) may be positioned between the first compressor (CP1) and second compressor (CP2) to manage and/or maintain the internal temperature (CIT) of the second compressor (CP2; see FIG. 4). Another advantage of the intercooler (ITC), is that at part load, the outgoing temperature of the first compressor is less than the temperature of the coolant. As such, energy will be extracted and partly recovered in the exhaust energy.

Alternatively, a second heat exchanger (HEX) may be incorporated into the present system to keep the compressor internal temperature of the second compressor (CP2) at or below about 85° C. In one embodiment, the second heat exchanger (HEX) is an air to exhaust (A2E) heat exchanger. The exhaust gas from the fuel cell stack (FCS) should pass through this intercooling stage first and then through an aftercooling stage through the A2E heat exchanger (HEX). The advantage of this process comprising the (A2E) heat exchanger is that it enables extraction of all exhaust energy. Conversely, the disadvantage of using the (A2E) heat exchanger is that the exhaust gas gets cooled at part load, reduces available exhaust energy, and potentially overcooling and condensing of water.

The parasitic compressor load can be reduced by operating the fuel cell stack at a lower pressure; a reduced operating pressure could be done, for example, when operating at higher altitudes. But, this reduction in operating pressure also results in reduced gross efficiency of the fuel cell stack, and generally requires lower fuel cell stack operating temperatures, which in turn influences ability to reject waste heat to ambient, for example, requiring higher cooling fan speeds. Thus, choice of operating pressure entails a trade-off between gross fuel stack operating efficiency and parasitic loads. With compressor outgoing temperature limits (COT) coming into consideration, particularly at altitudes of about 3000 m or higher, the trade-off to power operating pressure requiring additional heat exchangers (e.g., water cooling jacket) rather than an intercooler is likely preferred. Accordingly, to deal with compressor operating temperature limits, it is preferable to reduce the fuel cell stack operating pressure using a heat exchanger to avoid the need for additional hardware (e.g., an intercooler) and potential inefficiencies.

Example 4: Turbine Configurations that Most Efficiently Extract Energy from the Fuel Cell Power Module Systems Variable geometry (VG) turbines, known in the automotive industry to extract exhaust energy across operating platforms, could be employed in the present fuel cell power module system. More specifically, the following variable geometry turbine embodiments could be incorporated as the turbine (TB1) of the present fuel cell system:

VGT—Variable Geometry Turbocharger,
VNT—Variable Nozzle Turbine,
VTG—Variable Turbine Geometry,
VG—Variable Geometry turbocharger,
VGS—Variable Geometry System turbocharger, and
VTA—Variable Turbine Area.

These variable geometry (VG) turbines provide flexibility to the present fuel cell power module system. But, generally, they do not allow optimal efficiency of energy extraction across the entire operating temperature and pressure range. Alternatively, the present fuel cell power module system may comprise a fixed geometry or a waste gated turbine.

For a fixed geometry turbine configuration, the swallowing capacity is a key design parameter that strongly influences the pressure expansion ratio across the turbine. The expansion ratio increases as the turbine inlet corrected mass flow rate rises. The swallowing capacity is the corrected mass flow rate, above which the pressure ratio rises very rapidly with a small increase in inlet corrected mass flow rate.

For operating conditions of the fuel cell power module system with corrected turbine mass flow rate greater than the swallowing capacity of the fixed geometry turbine, the waste gate valves of the present disclosure may be opened so that the extra mass bypasses the turbine. When the corrected compressor mass inlet flows (MIFs) is below the swallowing capacity, the ability to extract exhaust energy is compromised because the expansion ratio follows the swallowing capacity curve. Overall, the efficiency of exhaust extraction for an optimized variable geometry (VG) turbine configuration would provide better capacity to extract exhaust energy across the full operating range than a waste gated turbine. Importantly, if efficient operation at low to mid-load conditions are required, the variable geometry turbine may also provide the best option.

Figure 6:
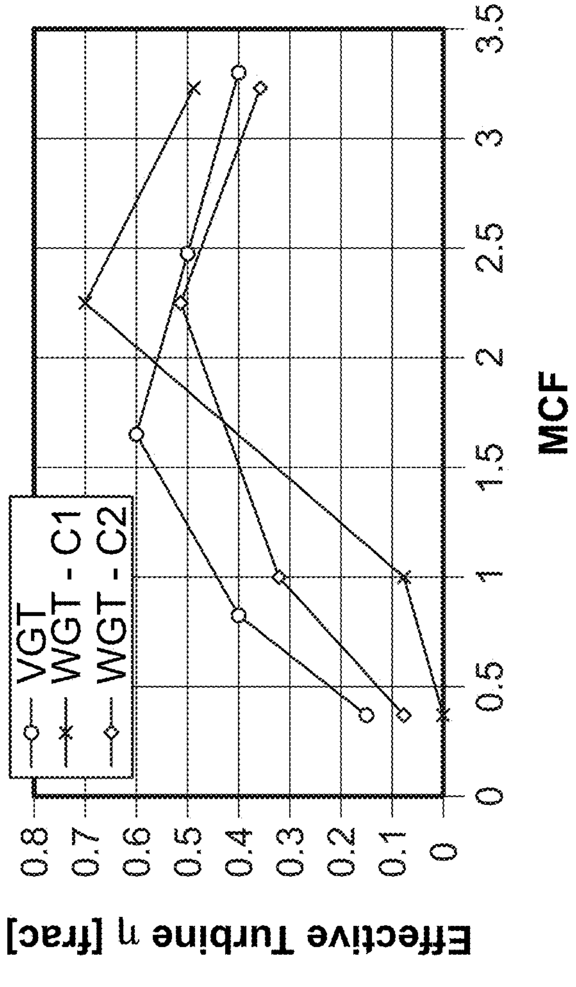
FIG. 6 is a graph demonstrating the effect of different turbine types used in the present fuel cell power module system.

Referring now to FIG. 6, however, if a waste gated turbine of the fuel cell power module system is configured with swallowing capacity associate with 50% load (C2 of FIG. 6), the higher load exhaust extraction efficiency of the waste gated turbine can match that of a VG turbine configuration. If the present system is configured with a waste gated turbine having a swallowing capacity associated with 75% load (C1 of FIG. 6), the higher load exhaust extraction efficiency of the waste gated turbine can be substantially better than the VG turbine configuration. Notably, a penalty would be paid if using a waste gated turbine at part load since the extraction efficiency would quickly drop to almost zero such that incorporation of the exhaust throttle (EXT) could help control and maintain the back pressure.

Accordingly, the inventors of the present fuel cell power module system have confirmed that a lower cost and lower complex waste gated turbine may be preferable over a variable geometry turbine. More specifically, if reasonable, light, or high loads are desirable, a waste gated turbine embodiment could provide comparable exhaust energy extraction results as a variable geometry turbine in the present system. In fact, a waste gated turbine that is not coupled to an electric drive provides the flexibility to configure the turbine opening pressure and size accordingly.

In addition, the waste gate valve may be positioned in a multiple of places in the present fuel cell power module system. In one embodiment, the waste gate valve may be incorporated into a turbo-charger. In another embodiment, the waste gate valve may be positioned upstream of the one or more heat exchangers (e.g., A2E HEX; see FIG. 4). Overall, the data of the present disclosure indicates that a waste gated turbine will typically be sufficient to operate in the present fuel cell power module system at high altitudes as compared to a variable geometry turbine.

Example 5: Managing Water Condensation Using the Heat Exchangers

In the present fuel cell power module system, there is also a need to manage water condensation within the system. In particular, it is important to manage the water condensation margins across the turbine wheel in order to avoid pitting. In addition to other damage and degradation that may occur, pitting refers to damage to the turbine wheel due to condensed droplets of water impinging on the wheel at high relative velocity. Importantly, the degrees of superheat (e.g., generally having a temperature ranging from about 0° C. to 10° C. above the dew point) must be high enough for the temperature and pressure expansion across the turbine wheel.

Specifically, addition of one or more or two or more heat exchangers, such as an A2E, A2L, or A2A heat exchanger (e.g., G-G HX), enables transfer of the excess heat from the compressor outlet fluid flowing to the fuel cell stack or system to the cathode exhaust leaving the fuel cell system or stack. This is advantageous to operation of the present fuel cell system or fuel cell power module system.

One advantage of the present system is that the cathode inlet gas (also called charge air) is cooled. The compressor discharges air at high pressure but also at a temperature that is too hot to be used in the fuel cell system without cooling. Having a heat exchanger (e.g., G-G HX) passively cool the compressor discharge air, advantageously without moving parts, enables a portion (if not all) of the unacceptable compression heat to be dissipated from the system. Additional cooling can be enabled, if necessary, by a secondary heat exchanger. However, the size and cooling capacity of any secondary heat exchanger (HEX) can be reduced in comparison to a system without the primary heat exchanger, particularly a A2A or G-G HX, since the G-G HX provides a portion of the required cooling.

Secondly, a heat exchanger, such as an A2A or G-G HX, allows for heating the cathode exhaust gas, which can in turn provide energy recovery and protect the KER (i.e., the turbine). As discussed above, some commercially available compressor units have an expansion turbine included on the back side of the unit. An expansion turbine can also be a stand-alone turbine. In either case, the expansion turbine allows the high-pressure cathode exhaust air to be depressurized in a way that recaptures a portion of the energy in the cathode exhaust gas, which is advantageous for the present fuel cell power module system and/or the present fuel cell system or stack.

By using the heat exchanger (e.g., an A2A or G-G HX), the highly saturated cathode exhaust air will be heated, which can create benefits. In some cases, some or all of any condensate of water droplets that may exit the fuel cell system in the cathode exhaust gas will be vaporized. This is helpful as water droplets can be detrimental to the KER or the turbine. For example, turbo machinery can be damaged by water contacting its bearings or seals or by having water freeze in the KER.

Another example is water droplets coming in contact with high speed impeller blades of the turbine can cause damage due to impact. Increasing the temperature also raises the enthalpic value of both the water and the air, making the turbine expansion process more effective and allowing more energy to be recovered. Stated otherwise, the cathode exhaust by passing through one or more heat exchangers, including but not limited to the A2A or G-G HX, collects some of the heat energy that was created by the compressor as a by-product of compressing the charge air and recovers that energy which would otherwise have been wasted.

If the resulting water, pressure, and temperature combination violates condensation limits, then the condensation limit should be adjusted by controlling the back pressure and condensation limit controls. More specifically, if a heat exchanger (HEX) is limiting a factor, a waste gate valve located upstream of the HEX could be opened to provide for a higher exhaust temperature rise. The exhaust throttle (EXT) could also be employed to control back pressure, as well as the bypass valve (BPV) to increase temperature and dilute the water concentration into the turbine. If using the bypass valve (BPV) to control back pressure, one can use the exhaust throttle downstream of the waste gate turbine to limit the expansion ratio (ER) across the waste gate turbine.

Alternatively, if a variable geometry (VG) turbine is used in the present fuel cell power module system, one can adjust its position to reduce the expansion ratio. In all cases, the net efficient of the fuel cell power module system would degrade. Implementing the present systems and methods described herein minimizes the reduction in system efficiency.

In fact, a preferred embodiment of the fuel cell power module system of the present disclosure is to implement a properly sized heat exchanger (HEX), such as a (A2E) heat exchanger, to avoid any need for a condensation limit control valve. Alternatively, an intercooler may be utilized. Additionally, one could insulate the system to retain as much heat as possible. Heat may also be added to the present system by an external heater.

Supplementary Data and Information regarding component, systems, and features of the claimed fuel cell power module system is provided with the instant disclosure. The contents, information, graphs, drawings, tables, and figures provided by the Supplementary Data and Information are incorporated herein by reference and considered part of the instant disclosure.

As used herein, an element or step recited in the singular and proceeded with the word “a” or “an” should be understood as not excluding plural of said elements or steps, unless such exclusion is explicitly stated. Furthermore, references to “one embodiment” of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms “first,” “second,” “third” and the like, as used herein do not denote any order or importance, but rather are used to distinguish one element from another. The term “or” is meant to be inclusive and mean either or all of the listed items. In addition, the terms “connected” and “coupled” are not restricted to physical or mechanical connections or couplings, and can include electrical connections or couplings, whether direct or indirect.

Moreover, unless explicitly stated to the contrary, embodiments “comprising,” “including,” or “having” an element or a plurality of elements having a particular property may include additional such elements not having that property. The term “comprising” or “comprises” refers to a composition, compound, formulation, or method that is inclusive and does not exclude additional elements, components, and/or method steps. The term “comprising” also refers to a composition, compound, formulation, or method embodiment of the present disclosure that is inclusive and does not exclude additional elements, components, or method steps.

The phrase “consisting of” or “consists of” refers to a compound, composition, formulation, or method that excludes the presence of any additional elements, components, or method steps. The term “consisting of” also refers to a compound, composition, formulation, or method of the present disclosure that excludes the presence of any additional elements, components, or method steps.

The phrase “consisting essentially of” or “consists essentially of” refers to a composition, compound, formulation, or method that is inclusive of additional elements, components, or method steps that do not materially affect the characteristic(s) of the composition, compound, formulation, or method. The phrase “consisting essentially of” also refers to a composition, compound, formulation, or method of the present disclosure that is inclusive of additional elements, components, or method steps that do not materially affect the characteristic(s) of the composition, compound, formulation, or method steps.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel cell power module system to enable robust exhaust energy extraction for high altitude operations, comprising:

an air filter, at least two compressors, a first compressor and a second compressor, each of the first and second compressors in fluid connection with each of a plurality of fuel cells in a fuel cell stack, wherein the second compressor is mechanically coupled to a turbine, one or more heat exchangers, comprising an air to exhaust (A2E) heat exchanger, and one or more fluid valves, comprising a bypass valve configured to connect the first compressor directly to the fuel cell stack, by bypassing the second compressor, wherein, during use, air from the second compressor flows to the fuel cell stack via said air to exhaust (A2E) heat exchanger.

2. The fuel cell power module system of claim 1, wherein the air filter is a low pressure air filter.

3. The fuel cell power module system of claim 1, wherein the high altitude comprises altitudes ranging from about 100 meters to about 5000 meters above sea level.

4. The fuel cell power module system of claim 1, wherein the first compressor is an electrically-driven compressor.

5. The fuel cell power module system of claim 1, wherein the one or more heat exchangers further includes an air to liquid (A2L) heat exchanger or an air to air (A2A) heat exchanger.

6. The fuel cell power module system of claim 1, wherein the turbine is a variable geometry turbine, a fixed geometry turbine, or a waste gated turbine.

7. The fuel cell power module system of claim 1, further comprising an intercooler.

8. The fuel cell power module system of claim 1, further comprising a humidifier.

9. The fuel cell power module system of claim 1, wherein the one or more valves are bypass valves or waste gate valves.

10. The fuel cell power module system of claim 1, further comprising an exhaust or an intake.

11. The fuel cell power module system of claim 10, wherein the exhaust comprises an exhaust pipe or an exhaust throttle and the intake comprises an intake valve or an intake pipe.

12. The fuel cell power module system of claim 1, wherein the fuel cell stack is a proton exchange membrane (PEM) fuel cell stack.

13. A two-stage fuel cell power module system to enable robust exhaust energy extraction for high altitude operations, comprising:

a first, electrically-driven compressor positioned before a second, mechanically-driven compressor in an intake stream, wherein the second, mechanically-driven compressor is coupled to a turbine, each of the first and second compressors in fluid connection with each of a plurality of fuel cells in a fuel cell stack, a first, air to exhaust (A2E) heat exchanger and a second heat exchanger, each of the heat exchangers positioned after the second compressor and in series connection with the first and the second compressors, one or more bypass or waste gate valves, comprising a bypass valve configured to connect the first compressor, by bypassing the second compressor, directly to the fuel cell stack, and an exhaust, wherein, during use, air from the second compressor flows to the fuel cell stack via said air to exhaust (A2E) heat exchanger and, optionally, via a humidifier.

14. The two-stage fuel cell power module system of claim 13, wherein the high altitude comprises altitudes ranging from about 100 to about 5000 meters above sea level.

15. The two-stage fuel cell power module system of claim 13, wherein the turbine is a variable geometry turbine or a fixed geometry turbine.

16. The two-stage fuel cell power module system of claim 13, further comprising components selected from the group consisting of an intercooler, a humidifier, an exhaust throttle, and an exhaust pipe.

17. The two-stage fuel cell power module system of claim 13, wherein the fuel cell stack is a proton exchange membrane (PEM) fuel cell stack.

18. A fuel cell power module system to enable robust exhaust energy extraction for high altitude operations, comprising:

an air filter, at least two compressors, a first compressor and a second compressor, each of the first and second compressors in fluid connection with each a plurality of fuel cells in a fuel cell stack, wherein the second compressor is mechanically coupled to a turbine, one or more heat exchangers comprising an air to exhaust (A2E) heat exchanger, and an intercooler positioned directly between the first compressor and second compressor, and one or more fluid valves, comprising a bypass valve configured to connect the first compressor directly to the fuel cell stack by bypassing the second compressor.

19. The fuel cell power module system of claim 1, wherein the air to exhaust (A2E) heat exchanger is a first heat exchanger and the fuel cell power module system further comprises a second heat exchanger such that during use, air from the second compressor flows to fuel cell stack via the first heat exchanger and the second heat exchanger.

20. The fuel cell power module system of claim 1, wherein the first and the second compressor are in a series connection.

* * * * *